(12) United States Patent
Ito

(10) Patent No.: US 8,537,147 B2
(45) Date of Patent: Sep. 17, 2013

(54) DISPLAY DEVICE AND FLEXIBLE SUBSTRATE OUTPUT TERMINAL ARRANGEMENT

(75) Inventor: Takuya Ito, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 405 days.

(21) Appl. No.: 12/905,503

(22) Filed: Oct. 15, 2010

(65) Prior Publication Data

US 2011/0090205 A1 Apr. 21, 2011

(30) Foreign Application Priority Data

Oct. 16, 2009 (JP) .................................. 2009-239580

(51) Int. Cl.
*G06F 3/038* (2006.01)

(52) U.S. Cl.
USPC ............................................ 345/204; 345/87

(58) Field of Classification Search
USPC .................. 345/87–104, 60–72, 76–83, 204; 315/169.3
See application file for complete search history.

(56) References Cited

U.S. PATENT DOCUMENTS

| | | | | |
|---|---|---|---|---|
| 5,777,610 | A * | 7/1998 | Sugimoto et al. ............. | 345/206 |
| 6,335,720 | B1 * | 1/2002 | Mori et al. ...................... | 345/98 |
| 6,664,942 | B1 * | 12/2003 | Kim et al. ........................ | 345/92 |
| 2002/0126082 | A1 * | 9/2002 | Matsuzaki ...................... | 345/98 |
| 2002/0140654 | A1 * | 10/2002 | Kim et al. ...................... | 345/87 |
| 2003/0090450 | A1 * | 5/2003 | Inada et al. .................... | 345/87 |
| 2003/0164843 | A1 * | 9/2003 | Sakaguchi .................... | 345/690 |
| 2004/0085279 | A1 * | 5/2004 | Kim et al. ........................ | 345/92 |
| 2005/0041006 | A1 * | 2/2005 | Lee et al. ......................... | 345/99 |
| 2005/0195356 | A1 * | 9/2005 | Aruga et al. ................... | 349/149 |
| 2005/0285833 | A1 * | 12/2005 | Yarita et al. .................... | 345/87 |
| 2006/0139291 | A1 * | 6/2006 | Cho et al. ....................... | 345/100 |
| 2008/0170057 | A1 * | 7/2008 | Park et al. ...................... | 345/211 |
| 2008/0174535 | A1 * | 7/2008 | Yoon et al. ...................... | 345/90 |

FOREIGN PATENT DOCUMENTS

| | | |
|---|---|---|
| JP | 4-170515 | 6/1992 |
| JP | 8-137446 | 5/1996 |
| JP | 11-311763 | 11/1999 |
| JP | 2000-75840 | 3/2000 |

(Continued)

OTHER PUBLICATIONS

Japanese Office Action issued Apr. 24, 2012, in Patent Application No. 2009-239580 (English translation only).

(Continued)

*Primary Examiner* — Vijay Shankar
*Assistant Examiner* — Nelson Lam
(74) *Attorney, Agent, or Firm* — Oblon, Spivak, McClelland, Maier & Neustadt, L.L.P.

(57) ABSTRACT

In one embodiment, a display device includes a display panel having a plurality of pixels and signal lines. A flexible substrate is electrically connected to the display panel through a connection portion. A driving circuit is mounted on the flexible substrate to drive the signal lines. The driving circuit includes first and second edges respectively opposing to input and output side ends of the flexible substrate, and a plurality of output terminals of the driving circuit are arranged along the first and second edges. The output terminals are set so as to be classified into two groups of valid output terminals to supply a signal to the signal lines and invalid output terminals not used to output a signal to the signal lines, and the valid output terminals are arranged along the second edge of the driving circuit so as to be sandwiched by the invalid output terminals.

13 Claims, 6 Drawing Sheets

(56) References Cited

FOREIGN PATENT DOCUMENTS

| | | |
|---|---|---|
| JP | 2005-215007 | 8/2005 |
| JP | 2006-23469 | 1/2006 |
| JP | 2006-330645 | 12/2006 |

OTHER PUBLICATIONS

Japanese Office Action issued Jul. 19, 2011, in Patent Application No. 2009-239580 (English-language translation only).

* cited by examiner

DISPLAY DEVICE AND FLEXIBLE SUBSTRATE OUTPUT TERMINAL ARRANGEMENT

CROSS-REFERENCE TO RELATED APPLICATION

This application is based upon and claims the benefit of priority from prior Japanese Patent Application No. 2009-239580, filed Oct. 16, 2009, the entire contents of which are incorporated herein by reference.

FIELD

The present invention relates to a display device and more particularly to an active-matrix type display device.

BACKGROUND

As a typical flat display device, for example, a liquid crystal display device includes a liquid crystal display panel equipped with a liquid crystal layer held between a pair of substrates. One substrate includes a plurality of picture electrodes arranged in the shape of a matrix, a plurality of scanning lines extending along with row lines of picture electrodes, and a plurality of signal lines along with column lines of the picture electrodes. The other substrate includes a common electrode opposing to the picture electrodes.

The one substrate further includes a gate driver which drives the scanning lines. A circuit board is electrically connected to one end of the substrate through a flexible substrate. A source driver (IC) which supplies picture signals to the signal lines is mounted on the flexible substrate.

The number of signals outputted in parallel from the source driver changes according to the number of the signal lines. In recent years, the number of signals outputted from the source driver increases with the demand for a high definition display, and the output terminals are provided not only in an edge located at an output side of the source driver but in an edge located at an input side of the source driver. In general, the source driver is formed so that the actual number of the output signals of the source driver is changeable by using some of the output terminals formed in the source driver. When all of the output terminals formed in the source driver are used, the output terminals formed in the input and output sides are set by denoting the respective one end and the other end of the output terminals as a starting terminal and a terminating terminal.

Here, the output wiring extending between the output terminals formed in the edge of the input side of the source driver and output terminals of the flexible substrate is pulled out by bypassing the short edge side of the source driver. If the output wirings are arranged so as to bypass in the vicinity of the short edge side of the source driver, a flexibility for designing the output wiring in a region between the short edge side of the source driver and an end of the flexible substrate is reduced.

Conventionally (referring to Japanese laid open patent application No. P2006-23469), the output wirings are pulled out from output terminals formed in the edge of the input side of the source driver to the output side of the source driver by passing under the source driver to make the flexibility for designing the output wirings in the vicinity between the short edge of the source driver and the end of the flexible substrate where the source driver is arranged. According to this method, it becomes possible to enlarge the flexibility for designing the output wirings in the vicinity of the region between the short edge of the source driver and the end of the flexible substrate.

However, if the output wirings are pulled out from the output terminals arranged at the input side to the output side of the source driver by passing under the source driver on the flexible substrate, the pitch between the wirings pulled out from the output side and the input side of the source driver becomes narrower, which sometimes results in difficulty in the arrangement of the wirings.

Furthermore, even if there were fewer output signals which are outputted to the signal lines than the total number of the output terminals of the source driver, the starting position of the output terminals is set to one end of the output terminals arranged along with the edges of the source driver, and the terminating position is set to the other end of the output terminals.

Therefore, even in this case, since the output wirings are pulled out in the vicinity between the short edge of the source driver and the end of the flexible substrate where the source driver is arranged, the design flexibility of the flexible substrate falls, and further, the flexible substrate may become large, which results in the difficulty in reducing a manufacturing cost.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
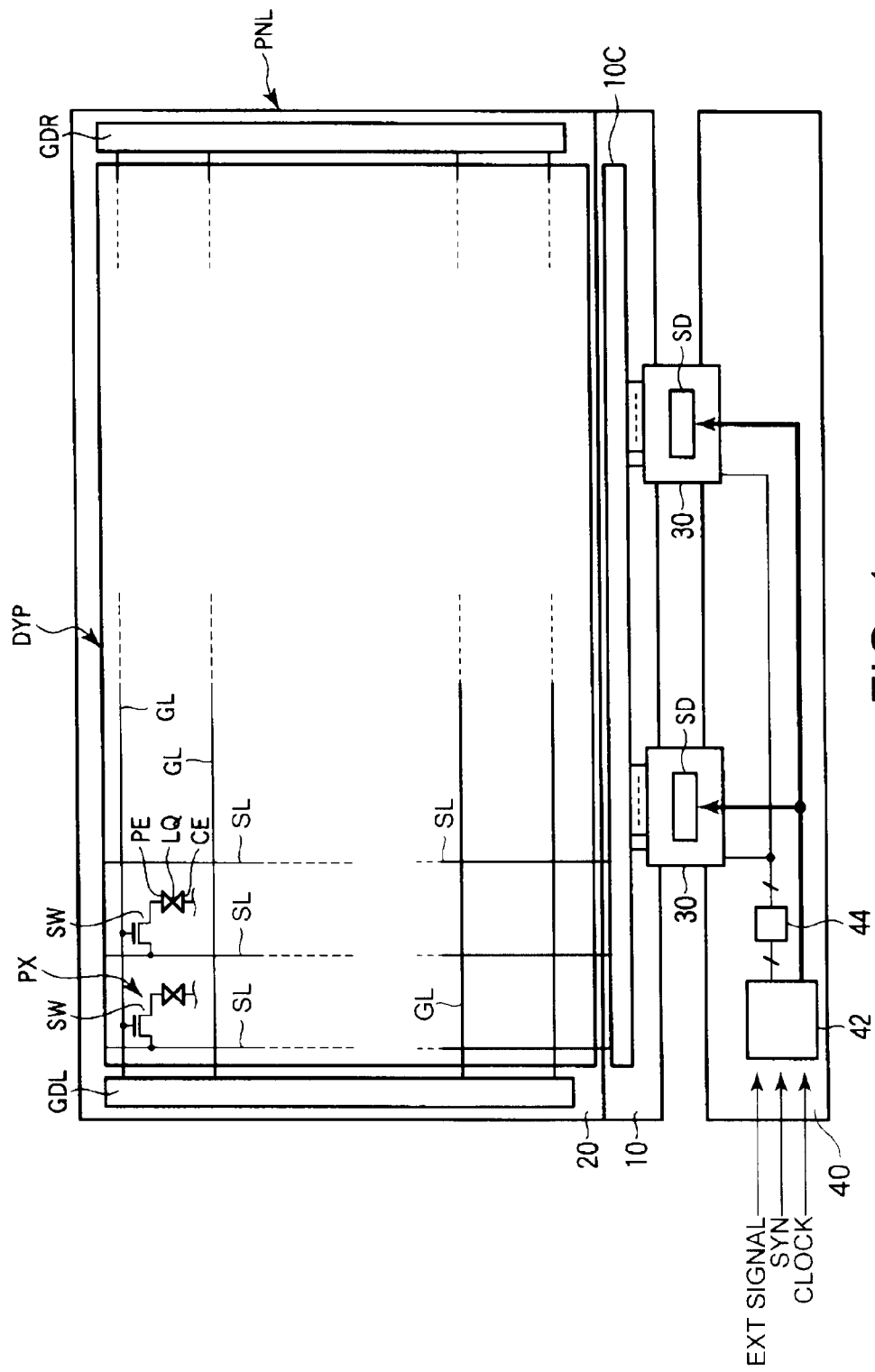
FIG. 1 is a block diagram showing a display device according to one embodiment of the present invention.

A display device according to an exemplary embodiment of the present invention will now be described with reference to the accompanying drawings wherein the same or like reference numerals designate the same or corresponding parts throughout the several views.

According to one embodiment of the present invention, a display device, includes: a display panel having a display portion with a plurality of pixels arranged in a matrix of rows and columns and a plurality of signal lines extending along the column; a flexible substrate electrically connected to the display panel through a connection portion; a driving circuit to drive the signal lines including a first edge opposing to an input side end of the flexible substrate, a second edge opposing to an output side end of the flexible substrate, and a plurality of output terminals arranged along the first and second edges; and an output wiring formed on the flexible substrate and extending in a region between the connection portion and the driving circuit; wherein the output terminals are set so that the output terminals are classified into two groups of valid output terminals to supply a signal to the signal line and invalid output terminals not used to output a signal to the signal line, and the valid output terminals are arranged along the second edge of the source driver so as to be sandwiched by the invalid output terminals.

As shown in FIG. 1, in this embodiment, a liquid crystal display device is used as the display device. The liquid crystal display device includes a liquid crystal display panel PNL containing a display portion DYP having a plurality of display pixels PX arranged in the shape of a matrix.

The liquid crystal display panel PNL is equipped with a liquid crystal layer LQ held by an array substrate 10 and a counter substrate 20 arranged so as to oppose to the array substrate 10 in the display portion DYP.

The array substrate 10 includes picture electrodes PE arranged in each display pixel PX, a plurality of scanning lines GL arranged along with row lines of the picture electrodes PE, a plurality of signal lines SL arranged along with column lines of the picture electrodes PE, and pixel switches SW arranged near the position where the signal lines SL and scanning lines GL cross each other.

The array substrate 10 further includes a gate driver GD and a switch circuit 10C arranged in a peripheral portion of the display portion DYP. The gate driver GD includes a gate driver GDR and a gate driver GDL arranged respectively along with two edges of the display portion DYP which counter each other. In the liquid crystal display device according to this embodiment, one end of the respective scanning lines is connected to the gate driver GDL, and the other end is connected to the gate driver GDR. One end of the respective signal lines SL is connected to the switch circuit 10C.

The counter substrate 20 includes a counter electrode CE arranged so that the counter electrode CE may oppose to the pixel electrodes PE. A counter voltage is supplied to the counter electrode CE by a counter electrode driving circuit which is not illustrated.

A circuit board 40 is electrically connected to one end of the array substrate 10 through a flexible substrate 30. A timing controller 42 and a level shift circuit 44 are mounted on the circuit board 40.

An external picture signal, a synchronizing signal, a clock signal, etc. are supplied to the timing controller 42 from an external signal source which is not illustrated. The timing controller 42 outputs a picture signal, that is, a gradation signal, a control signal to control the gate driver GD to drive the scanning lines GL sequentially, a control signal supplied to the counter electrode driving circuit, and a control signal for the switch circuit 10C, etc.

The control signals for the gate driver GD and the switch circuit 10C outputted from the timing controller 42 are supplied to the level shift circuit 44, and then are converted into suitable voltage values by the level shift circuit 44. Further, the converted signals are supplied to the gate drivers GDL, GDR, and the switch circuit 10C.

Figure 2:
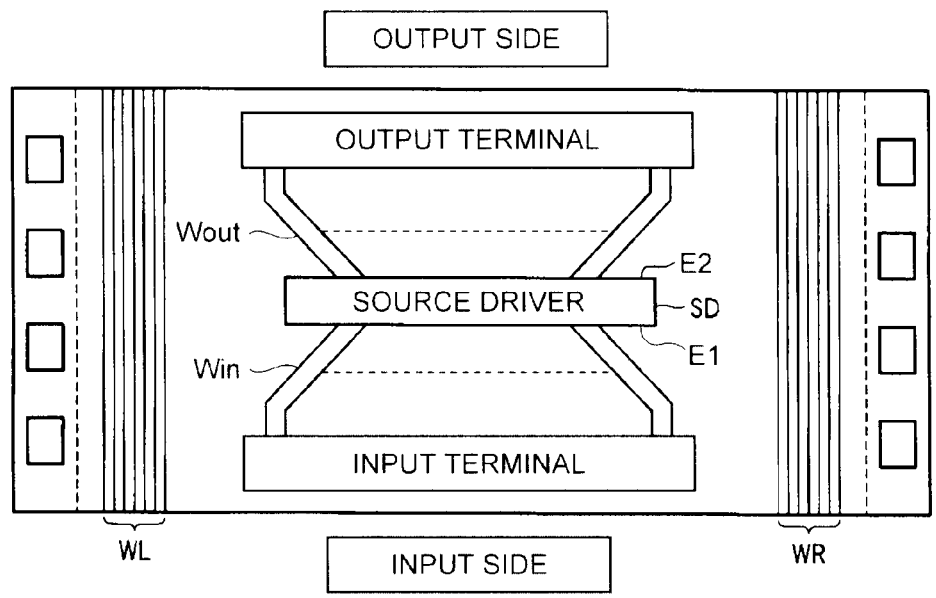
FIG. 2 is a diagram showing a structure of a flexible substrate used in the display device shown in FIG. 1.

The picture signal outputted from the timing controller 42 is supplied to a source driver SD (IC) mounted on the flexible substrate 30 as shown in FIG. 2.

The flexible substrate 30 is connected to the circuit board 40. Input side terminals of the flexible substrate 30 are connected with input terminals of the source driver SD by input wirings Win. On the other hand, output terminals of the source driver SD are connected with output side terminals of the flexible substrate 30 by output wirings Wout. The output side terminals of the flexible substrate 30 are connected with the liquid crystal panel PNL.

In a region between a short edge of the source driver SD and an end of the flexible substrate 30, wirings WR and WL are arranged so as to extend between the input side terminal and the output side terminal of the flexible substrate 30. The control signals of the gate drivers GDL, GDR, and the switch circuit 10C are supplied to the wirings WL and WR. That is, the signals are supplied to the liquid crystal display panel PNL from the circuit board 40 through the wirings WL and WR of the flexible substrate 30. The wirings WL and WR may contain wirings for supplying power, a clock signal, and etc. to the liquid crystal display panel PNL.

Figure 3:
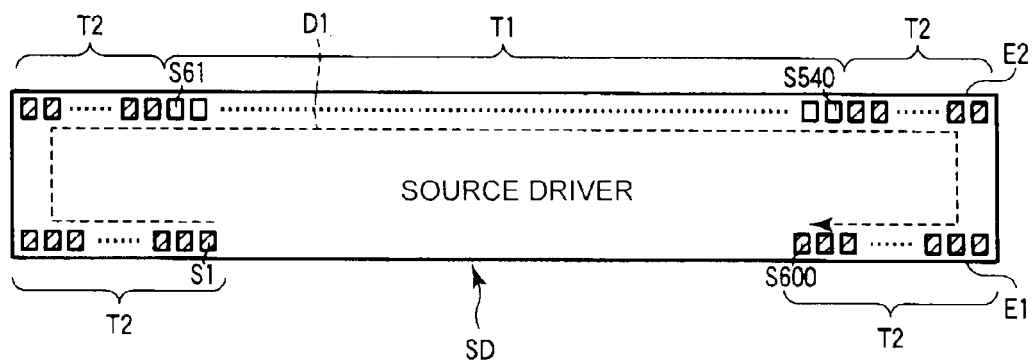
FIG. 3 is a diagram showing a structure of a source driver mounted on the flexible substrate shown in FIG. 2.

In the liquid crystal device according to this embodiment, as shown in FIG. 3, the source driver SD uses 600 out terminals as total number. 480 output terminals (S61-S540) of the total 600 output terminals (S1-S600) are actually used for outputting the signals to the signal lines SL. That is, the output terminals of the source driver SD include 480 valid output terminals and 120 invalid (dummy) output terminals. All of the 600 output terminals may be utilize as valid output terminals according to the specification of the liquid crystal display panel PNL used, without preparing invalid output terminals, and the setup of the valid output terminals can be changed by an output number change signal for outputting signals mentioned later.

The output terminals of the source driver SD are prepared along with both an edge E1 of the source driver SD by the side of the input terminals of the flexible substrate 30 and an edge E2 of the source driver SD by the side of the output terminals of the flexible substrate 30.

The output terminals of the source driver SD from a starting terminal S1 (the first output terminal) stationed at the edge E1 to the termination terminal S600 (600th output terminal) stationed at the same edge E1 are assigned by the addresses (0-599) so that the addresses may stand in a direction D1 of a clockwise rotation in ascending order along with the edge E1 and the edge E2 of the source driver SD.

Here, in the direction D1 in which the output terminals are located in a line along with the edge E1 and the edge E2 as mentioned above, a valid output terminal group T1 which consists of a plurality of valid output terminals is arranged between a pair of invalid output terminal groups T2 which consist of a plurality of invalid output terminals. In the case shown in FIG. 3, for example, the output terminals from the first terminal S1 to the 60th output terminals S60, and from the 541th terminals S541 to the termination terminal S600 are invalid output terminals.

The output terminals S61-S540 (61th output terminal-540th output terminal) between the invalid output terminal groups T2 consisting of a plurality of invalid output terminals are valid output terminals. In the liquid crystal display according to this embodiment, as shown in FIG. 3, the valid output terminal group T1 is arranged only at the edge E2 of the source driver SD, and is arranged in the central portion of the edge E2 of the source driver SD.

Thus, the valid output terminal group T1 is arranged only at the edge E2 side of the source driver SD and specifically in the central portion of the edge E2. Accordingly, the output wiring Wout extending to the output side terminal of the flexible substrate 30 from the valid output terminal group T1 is not pulled out through the region between the short edge of the source driver SD and the end of the flexible substrate 30. That is, the valid output terminals are used by arranging the output terminal group T1 in the central portion of the edge E2, and setting the first output terminal of the output terminal group T1 as the first starting valid output terminal S61 without setting up the valid output terminals in turn from the starting output terminal S1 of the source driver SD. The position of the valid output terminal group T1 may be set up so as to close to the short edge of the source driver SD, not in the central portion of the edge E2. However, it is more advantageous on a design to arrange the pair of the invalid output terminal groups T2 equally to the both sides of the valid output terminal group T1. Therefore, since the region between the short edge of the source driver SD and the end of the flexible substrate 30 is not used for the output wiring, the design flexibility is improved, and it becomes possible to make the flexible substrate 30 small, which results in reduction in a manufacturing cost.

In addition, in the case shown in FIG. 3, although the valid output terminal group T1 is arranged only at the edge E2 side of the source driver SD, when the number of the output signals from the source driver SD is more than the total number of the terminals arranged at the edge E2 of the source driver SD, some of the output terminals arranged at the edge E1 may be assigned to valid output terminals. Accordingly, even in this case, if the more the number of the valid output terminals arranged at the edge E1 side is lessened, the more the number of the wirings pulled out in the region between the short edge of the source driver SD and the end of the flexible substrate 30 decreases, which results in raising of the design flexibility of the flexible substrate 30 and reduction in the manufacturing cost.

Namely, when the total number of the valid and invalid output terminals of the source driver SD arranged at the edge E2 is less than the number of the valid output signals outputted from the source driver SD, the number of the wirings pulled out in the region between the short edge of the source driver SD and the end of the flexible substrate 30 can be lessened by including at least one invalid output terminal among two or more invalid output terminals at the edge E1 in the valid output terminals.

Figure 4:
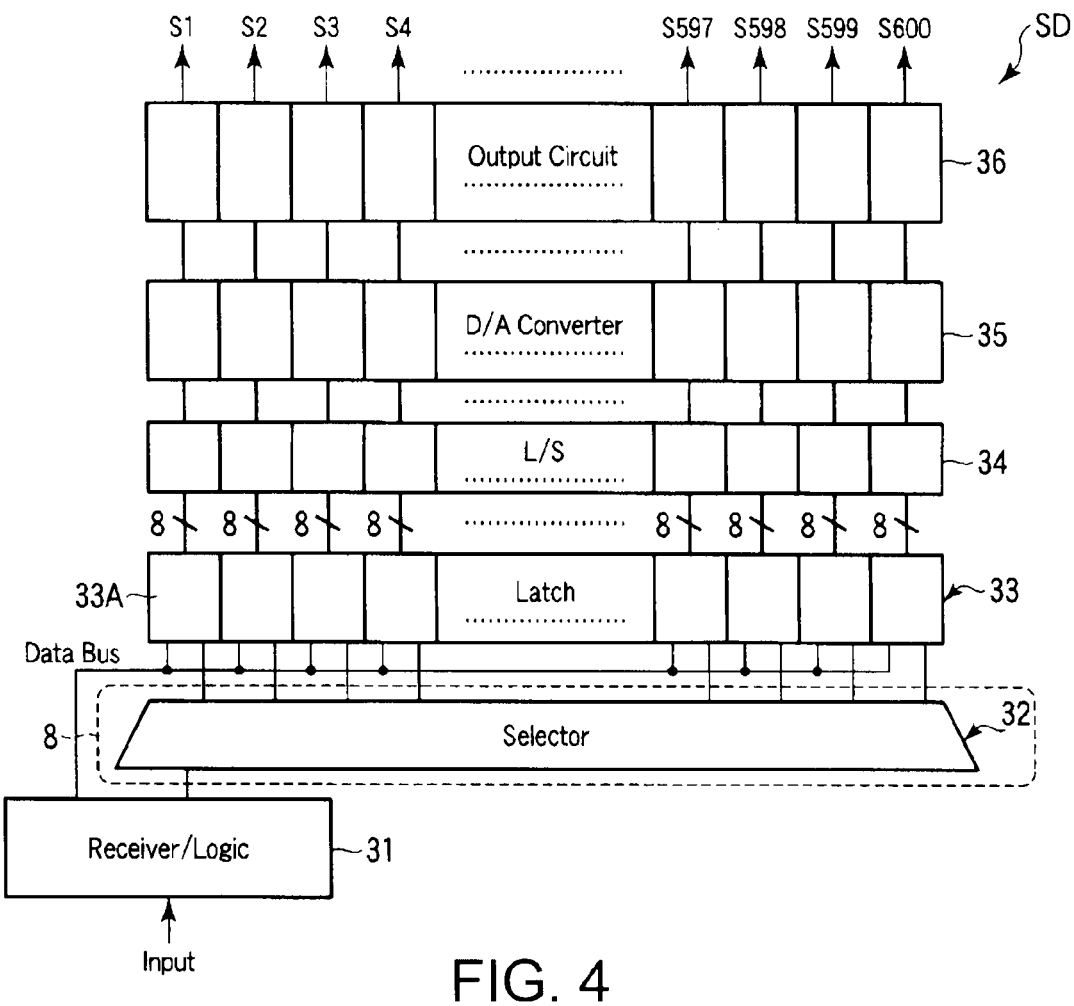
FIG. 4 is a circuit diagram showing the source driver shown in FIG. 3.

As shown in FIG. 4, the source driver SD includes a receiving circuit (Receiver) 31 to receive the input signal (Input) from the timing controller 42, a selection circuit (Selector) 32 to select the output signal from the receiving circuit (Receiver) 31, a latch circuit (Latch) 33 to which the selection signal from the selection circuit 32 and digital signals such as the picture signals from the receiving circuit 31 are supplied, a level shifter (LIS) 34 to carry out level conversion of the signal latched by the latch circuit 33, a D/A convertor 35 to convert the level converted digital signals into analog signals, and an output circuit 36.

Figure 5:
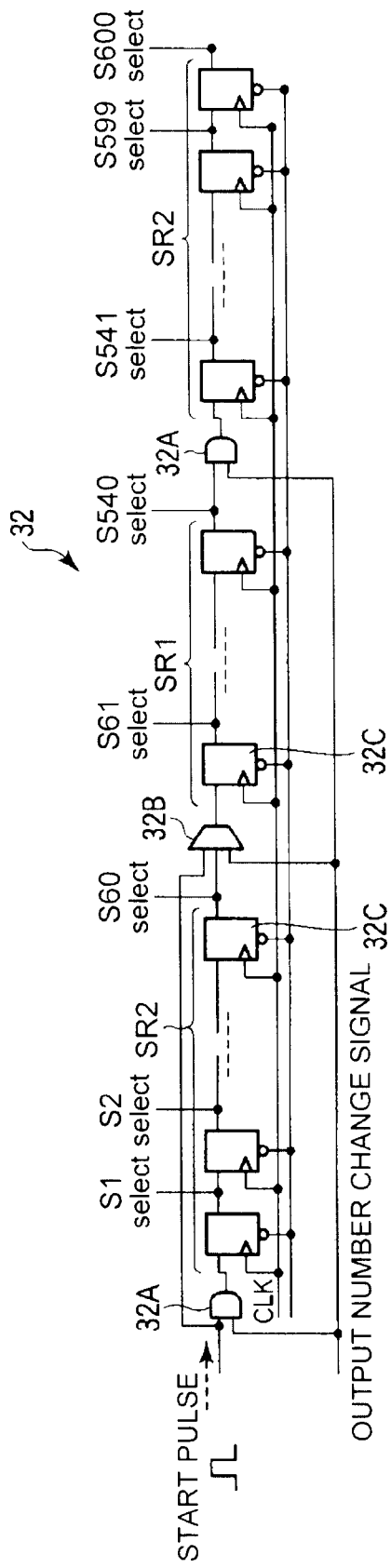
FIG. 5 is a circuit diagram showing a selection circuit of the source driver SD shown in FIG. 4.

The signal from the timing controller 42 is received by the receiving circuit 31, and is supplied to the selection circuit 32 and the latch circuit 33. The selection circuit 32 includes a plurality of shift registers 32C connected in series as shown in FIG. 5. The shift registers 32C constitute a first shift register group SR1 which outputs the selection signal to select the valid output terminal group T1, and two second shift register groups SR2 arranged in preceding and subsequent to the first shift register group SR1 (input and output sides). The first shift register group SR1 is arranged between the two second shift register groups SR2.

A first arithmetic circuit 32A to which an output number change signal and a start pulse are inputted respectively, is arranged at the preceding stage of the second shift register group SR2. A second arithmetic circuit 32B to which the output number change signal, the start pulse, and the output signal of the second shift register group SR2 are inputted respectively, is arranged at the preceding stage of the first shift register group SR1.

The output number change signal is used to change over the number of the output terminals of the source driver SD for supplying picture signals to the signal lines SL. For example, the output number change signal is produced by operating a mechanical change over means, such as a dial and a switch provided for the source driver SD. Further, it is possible to electrically produce the output number change signal by a table stored in a semiconductor memory or an arithmetic processing, etc. In the display device according to this embodiment, the number of the valid output terminals of the source driver SD is changed to either of 600 or 480 by the output number change signal. That is, the embodiment makes possible to use commonly the same source driver SD regardless of the size of the liquid crystal display panel PNL, i.e., the number of the signal lines SL.

When the start pulse is inputted into the selection circuit 32 as a trigger pulse, the selection circuit 32 selects each shift register 32C connected in series one by one using a plurality of shift registers 32C, and transmits selection signals S1, S2 - - - S600 to the latch circuit 33.

AND operation between the start pulse and the output number change signal is done by the first arithmetic circuit 32A, and the result is supplied to the former second shift register group SR2. The output signal from the first arithmetic circuit 32A changes according to the output number change signal. For example, when the start pulse and the output number change signal are supplied to both of the input terminals of the first arithmetic circuit 32A, the pulse signal synchronizing with the start pulse is outputted from the first arithmetic circuit 32A, and the shift register 32C is driven. As a result, the pulse signal shifted by one clock synchronizing with the clock signal CLK is outputted from the shift register 32C, and is supplied to the latch circuit 33 as the selection signal S1. Similarly, selection signals S2 S60 are retrieved from each shift register 32C hereafter. On the other hand, when the output number change signal is not supplied (in case of a selection invalid signal), neither the selection signal S1 nor the selection signal S60 are generated by the shift register 32C because the output pulse signal is not generated in the output terminal of the first arithmetic circuit 32A.

Thus, for example, when selecting the output terminals from the output terminal S1 to the output terminal S600 as valid output terminals by the output number change signal, the first arithmetic circuit 32A outputs the signals for selecting the output terminals from the output terminal S1 to the output terminal S60, and the output terminals from the output terminal S541 to the output terminal S600 by supplying the output number change signal.

Moreover, the start pulse, the S60 selection signal of the shift register 32C, and the output number change signal are supplied to the second arithmetic operating circuit 32B, and the selection signals from S61 to S540 shifted one by one are acquired from each shift register 32C connected to the second arithmetic circuit 32B. Thereby, the output terminals from the output terminal S1 to S600 can be used as valid output terminals.

On the other hand, when selecting only the output terminals from the output terminal S61 to the output terminal S540 as valid output terminals by the output number change signal, the shift pulse signal is not generated by the shift register 32C because the output number change signal is not supplied to the first arithmetic circuit 32A. For this reason, what is necessary is just to output a signal (signal for non-selecting) for the output terminals from the output terminal S1 to the output terminal S60, and the output terminal S541 to the output terminal S600 not to be selected.

That is, each shift register 32C which constitutes the second shift register group SR2 outputs the result signal by the AND operation as the non-selection signal one by one according to the clock signal CLK. The signal outputted from each shift register 32C is supplied to the latch circuit 33 while the output signal is supplied to the adjoining shift register 32C.

The signal outputted from the former second shift registers group SR2, the start pulse and the output number change signal are operated by the second arithmetic circuit 32B. The result of the operation is supplied to the first shift register group SR1. The signal outputted from the second arithmetic circuit 32B is a signal which drives the shift registers 32C connected to the second arithmetic circuit 32B so that the output terminals from the output terminal S61 to the output terminal 5540 may always be selected regardless of the output number change signal.

The shift registers 32C which constitute the first shift register group SR1 output the signal generated by the operation of the second arithmetic circuit 32B as the selection signal one by one according to the clock signal CLK. The signal outputted from each shift register 32C is supplied to the latch circuit 33 while the output signal is supplied to the adjoining shift register 32C.

AND operation between the output signal from the first shift register group SR1 and the output number change signal is done by the latter first arithmetic circuit 32A, and the output signal from the latter first arithmetic circuit 32A is supplied to the latter second shift registers group SR2. The respective shift registers 32C which constitute the second shift register group SR2 output a signal generated by the AND operation of the first arithmetic circuit 32A as the selection signal one by one according to the clock signal CLK. The signal outputted from each shift register 32C is supplied to the latch circuit 33 while the output signal is supplied to the adjoining shift register 32C.

When the output number change signal is changed over so that all the output terminals S1 to S600 of the source driver SD may be used to supply picture signals to respective signal lines SL, the selection signals which select the output terminals S1 to 5600 are outputted to the latch circuit 33 from the selection circuit 32.

When the output number change signal is changed over so that some output terminals (S61-S540) arranged at the central portion of the edge E2 of the source driver SD may be used to supply picture signals to respective signal lines SL, the selection signals which select the output terminals S61 to S540 are outputted to the latch circuit 33 from the selection circuit 32, and non-selection signals to set the output terminals S1 to S60 and output terminals S541 to S600 non-selection state are outputted.

The latch circuit 33 is constituted by a plurality of latch circuit elements 33A. The picture signal outputted from the receiving circuit 31 is supplied to each latch circuit element 33A to which the selection signal for selecting the output terminal as a valid output terminal is supplied. In synchronizing with display timing, all the picture signals outputted from the latch circuit 33 are simultaneously supplied to the output circuit 36 through a level shifter 34 after being converted by the D/A converter 35.

When the analog converted picture signal is supplied to the output circuit 36, an output signal having a stabilized potential by an amplifier circuit (Amp) in the output circuit 36 is outputted from an output terminal. The output signal from the output circuit 36 is supplied to the switch circuit 10C of the array substrate 10. The switch circuit 10C is equipped with, for example, a multiplexer, and distributes the supplied signal to corresponding some signal lines SL, respectively. The signal supplied to the signal line SL is impressed to the picture electrode PE through the pixel switch SW.

As mentioned above, when some of the total output terminals of the source driver SD are used as valid output terminals, and the valid and invalid output terminals are arranged so that the valid output terminal group T1 is arranged in the central portion of the edge E2 of the source driver SD, it is suppressed that the output wiring Wout is arranged in the region between the short edge of the source driver SD and the short end of the flexible substrate 30. Therefore, it becomes possible to utilize the pattern region of the flexible substrate 30 effectively, and the flexibility of the pattern design of the flexible substrate 30 can be raised while it is possible to make the flexible substrate 30 small.

That is, according to this embodiment, while the flexibility of a wiring design of the flexible substrate is improved, the manufacturing cost can be reduced.

Moreover, in the display device according to the above-mentioned embodiment, the number of the output terminals of the source driver SD used for the signal output to the signal lines SL is reduced by using the switch circuit 10C, such as, a multiplexer. That is, it becomes possible to supply output signals to a plurality of signal lines SL from one output terminal by using the switch circuit 10C. Therefore, the number of the effective output terminals can be decreased by using the switch circuit 10C, and the valid output terminal group T1 can be arranged only at the edge E2 side of the source driver SD, which results in increasing in the design flexibility of the flexible substrate 30. As mentioned above, the design flexibility of the flexible substrate 30 can be more effective by combining with the switch circuit 10C.

Figure 6:
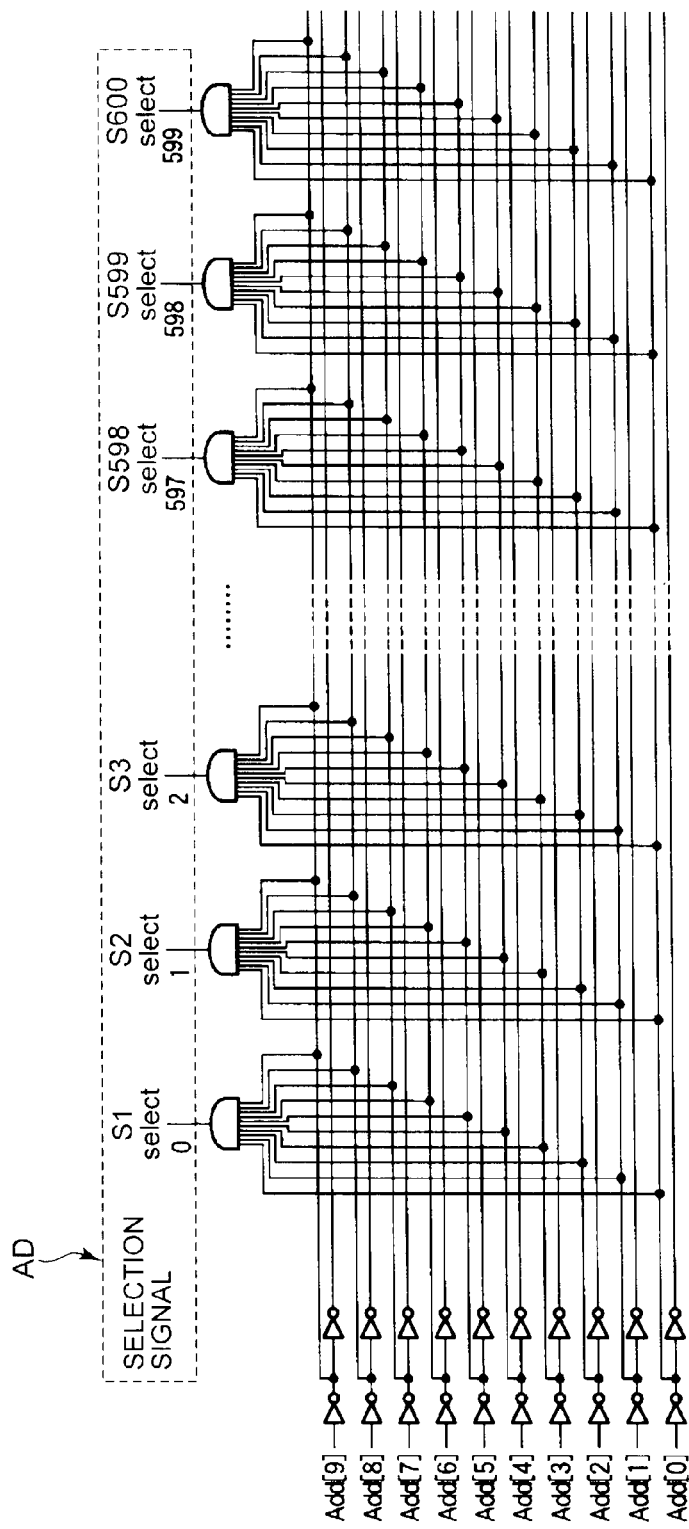
FIG. 6 is a circuit diagram showing an address decoder to supply a selection signal to select valid output terminals of the source driver shown in FIG. 3.
Figure 7:
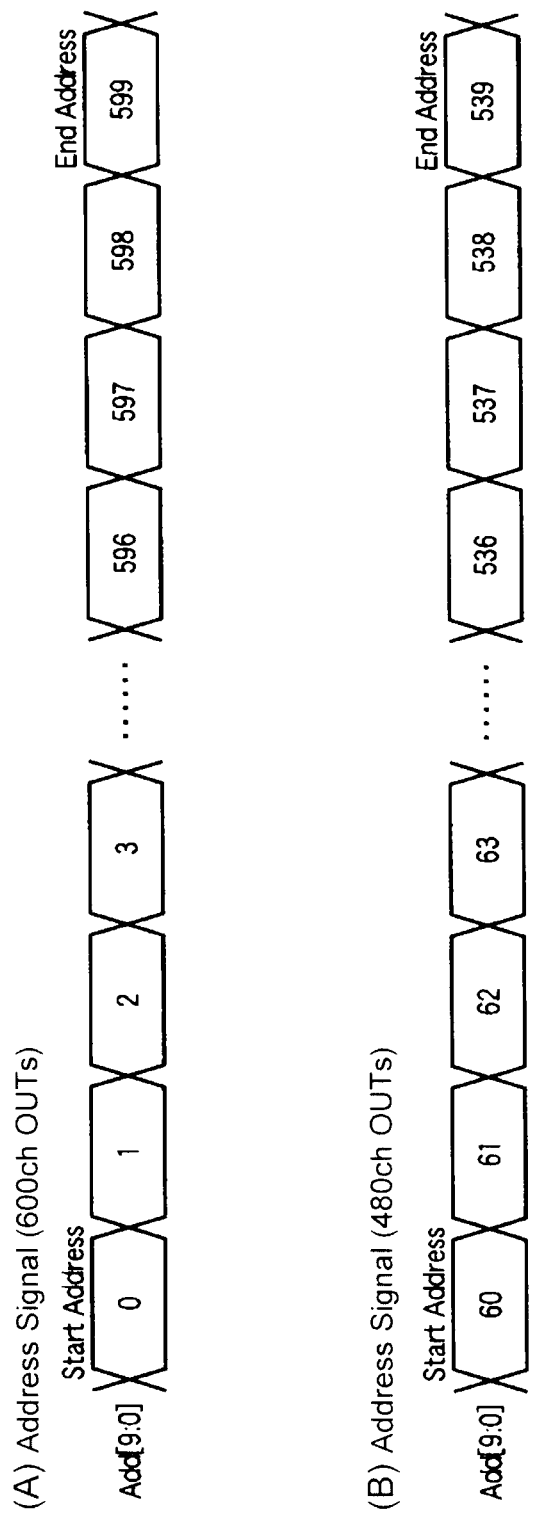
FIG. 7 is a diagram for explaining one example of signals supplied to the address decoder shown in FIG. 6.

In addition, the liquid crystal display according to the above-mentioned embodiment may select valid output terminals from the output terminals of the source driver SD by an address decoder AD as shown in FIG. 6, while the selection circuit 32 shown in FIG. 5 is equipped with a plurality of shift registers 32C.

The address decoder AD is mounted on the circuit board 40. The address decoder AD is equipped with a plurality of AND circuits into which 10-bit address signals (Add [0]-Add [9]) outputted from the timing controller 42 are inputted as shown in FIG. 6.

Among the address signals (Add [0]-Add [9]), when outputting signals in parallel using 600 output terminals, a starting address becomes 0 (zero) and an end address becomes 599. In the address number, the start address S1 is set to 0 (zero), and the address of the termination terminal S600 is set to 599. Therefore, all the output terminals from starting terminal S1 to the termination terminal 5600 are selected.

When outputting 480 signals in parallel using the same source driver SD, the starting address becomes 60 and the end address becomes 539. Therefore, the output terminals (S61-S540) from the 61st terminal to the 540th terminal are selected.

The selection signal is supplied to the latch circuit 33 from each AND circuit to which the address signal is supplied. The picture signal outputted from the timing controller 42 is supplied to the latch circuit 33 to which the selection signal is supplied.

As mentioned above, even if the address decoder AD, not the selection circuit 32 is used, the same effect as the case where the selection circuit 32 is used can be acquired by addressing the valid output terminals of the output terminals of the source driver SD as mentioned above.

Furthermore, in the above embodiment, a liquid crystal display device is used as a display device. However, the embodiment can be applied to other active-matrix type display devices in which a flexible substrate is connected to one end of a display panel having a display portion, and a source driver SD is mounted on the flexible substrate. For example, if the invention is applied to an organic electroluminescence (EL) display device or a plasma display device, the same effects as the liquid crystal display device according to the above embodiment can be achieved.

While certain embodiments have been described, these embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural elements disclosed in the embodiments. Furthermore, structural elements in different embodiments may properly be combined. The accompanying claims and their equivalents are intended to cover such forms or modifications as would fall with the scope and spirit of the inventions.

What is claimed is:

1. A display device, comprising:
   a display panel including a display portion having a plurality of pixels arranged in a matrix of rows and columns and a plurality of signal lines extending along the column;
   a flexible substrate electrically connected to the display panel through a connection portion;
   a driving circuit to drive the signal lines including a first edge opposing to an input side end of the flexible substrate, a second edge opposing to an output side end of the flexible substrate, and a plurality of output terminals arranged along the first and second edges; and
   an output wiring formed on the flexible substrate and extending in a region between the connection portion and the driving circuit;
   wherein the output terminals are set so that the output terminals are classified into two groups of valid output terminals to supply a signal to the signal line and invalid output terminals not used to output a signal to the signal line,
   the valid output terminals are arranged along the second edge of the source driver so as to be sandwiched by the invalid output terminals,
   the driving circuit includes a selection circuit to select the valid output terminals from the output terminals of the driving circuit by an output number change signal for changing over the number of the valid output terminals,
   the selection circuit includes a plurality of shift registers connected in series,
   the shift registers include a first shift register group to output a signal for selecting the valid output terminal group having a plurality of valid output terminals, and a plurality of second shift register groups to output a signal for selecting the invalid output terminal group having a plurality of invalid output terminals,
   the first shift register group is arranged between the second shift register groups,
   a first operating circuit is arranged in a preceding stage of the second shift register group to receive the output terminal number change signal and a start pulse,
   a second operating circuit is arranged in a preceding stage of the first shift register group to receive the output terminal number change signal, the start pulse and the output signal of the second shift register group arranged in the preceding stage of the first shift register group, and in case the number of the output signals of the driving circuit is changed over to the number of the valid output terminals, the first operating circuit outputs a signal to set the invalid output terminal group in a non-selecting state to the second shift register group, and the second operating circuit outputs a signal to select the valid output terminal group to the first shift register group.

2. The display device according to claim 1, wherein the driving circuit is a source driver.

3. The display device according to claim 1, wherein an address is assigned to the respective output terminals, and the selection circuit includes a decoder to select an address of the valid output terminal.

4. The display device according to claim 1, wherein the display panel includes a switch circuit connected between the signal lines and the valid output terminals of the driving circuit, and the respective output signals from the valid output terminals are distributed to two or more signal lines.

5. The display device according to claim 4, wherein the switch circuit is constituted by a multiplexer.

6. The display device according to claim 1, further comprising a circuit board connected to the flexible substrate.

7. The display device according to claim 6, further comprising a timing controller arranged on the circuit board to receive a clock signal, a synchronizing signal and an external picture signal.

8. The display device according to claim 1, wherein the display device is a liquid crystal display device (LCD).

9. The display device according to claim 1, wherein the display device is an organic electroluminescence (EL) display device.

10. The display device according to claim 1, wherein the display device is a plasma display device.

11. A liquid crystal display device, comprising:
    a display panel including a first substrate, a second substrate, a liquid crystal layer held between the substrates, a plurality of pixels arranged in a matrix of rows and columns, and a plurality of signal lines extending along the column;
    a flexible substrate electrically connected to the display panel through a connection portion formed at an output end side of the flexible substrate;
    a source driver mounted on the flexible substrate to drive the signal lines including a first edge opposing to an input side end of the flexible substrate, a second edge opposing to an output side end of the flexible substrate, and a plurality of output terminals arranged along the first and second edges of the source driver;
    a circuit board connected to the flexible substrate at its input side end; and
    an output wiring formed on the flexible substrate and extending in a region between the connection portion and the source driver;
    wherein the output terminals of the source driver are set so that the output terminals are classified into two groups of valid output terminals to supply a signal to the signal line and invalid output terminals not used to output a signal to the signal line,
    the valid output terminals are arranged along the second edge so as to be sandwiched by the invalid output terminals,
    the source driver includes a selection circuit to select the valid output terminals from the output terminals of the source driver by an output number change signal for changing over the number of the valid output terminals,
    the selection circuit includes a plurality of shift registers connected in series, the shift registers include a first shift register group to output a signal for selecting the valid output terminal group having a plurality of valid output terminals and a plurality of second shift register groups to output a signal for selecting the invalid output terminal group having a plurality of invalid output terminals, the first shift register group is arranged between the second shift register groups, a first operating circuit is arranged in a preceding stage of the second shift register group to receive the output terminal number change signal and a start pulse, a second operating circuit is arranged in a preceding stage of the first shift register group to receive the output terminal number change signal, the start pulse and the output signal of the second shift register group arranged in the preceding stage of the first shift register group, and in case the number of the output signals of the driving circuit is changed over to the number of the valid output terminals, the first operating circuit outputs a signal to set the invalid output terminal group in a non-selecting state to the second shift register group, and the second operating circuit outputs a signal to select the valid output terminal group to the first shift register group.

12. The liquid crystal display device according to claim 11, wherein the display panel includes a switch circuit connected between the signal lines and the valid output terminals, and the respective output signals from the valid output terminals are distributed to two or more signal lines.

13. The liquid crystal display device according to claim 12, wherein the switch circuit is constituted by a multiplexer.

* * * * *